(12) United States Patent
Waruschewski et al.

(10) Patent No.: US 10,619,572 B2
(45) Date of Patent: Apr. 14, 2020

(54) METHOD AND APPARATUS FOR PURGING AND/OR SEALING AT LEAST ONE BURNER OF A GAS TURBINE PLANT

(71) Applicant: Siemens Aktiengesellschaft, Munich (DE)

(72) Inventors: Andreas Waruschewski, Bottrop (DE); Ismail Belkahla, Recklinghausen (DE); Volker Ertle, Hattingen (DE); Kirjiakos Galanakis, Witten (DE); Gülsen Schymetzko, Muelheim an der Ruhr (DE); James Smith, Raesfeld (DE); Patrick Wünsche, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 510 days.

(21) Appl. No.: 15/320,642
(22) PCT Filed: Jun. 22, 2015
(86) PCT No.: PCT/EP2015/063964
§ 371 (c)(1),
(2) Date: Dec. 20, 2016
(87) PCT Pub. No.: WO2016/000995
PCT Pub. Date: Jan. 7, 2016

(65) Prior Publication Data
US 2017/0138269 A1 May 18, 2017

(30) Foreign Application Priority Data
Jul. 2, 2014 (DE) .......................... 10 2014 2128 24

(51) Int. Cl.
*F02C 7/232* (2006.01)
*F23K 5/18* (2006.01)
(Continued)

(52) U.S. Cl.
CPC ............ *F02C 7/232* (2013.01); *F23K 5/18* (2013.01); *F02C 6/08* (2013.01); *F02C 7/228* (2013.01);
(Continued)

(58) Field of Classification Search
CPC .... F02C 6/08; F02C 7/22; F02C 7/228; F02C 7/232; F23K 5/18; F23K 2301/203;
(Continued)

(56) References Cited

U.S. PATENT DOCUMENTS 5,369,951 A * 12/1994 Corbett ................ F01K 21/047
60/39.3
6,145,318 A * 11/2000 Kaplan ..................... F02C 7/08
60/39.094

(Continued)

FOREIGN PATENT DOCUMENTS

DE 3916477 A1 11/1990
EP 1124047 A1 8/2001
EP 2309187 A2 4/2011

OTHER PUBLICATIONS

International Search Report dated Oct. 2, 2015, for PCT application No. PCT/EP2015/063964.

(Continued)

*Primary Examiner* — Gerald L Sung
*Assistant Examiner* — James P McGlynn
(74) *Attorney, Agent, or Firm* — Beusse Wolter Sanks & Maire

(57) ABSTRACT

A purging and/or sealing apparatus for conveying a purging and/or sealing fluid to at least one burner of a gas turbine plant. The purging and/or sealing apparatus has a pressure accumulator and a heating device, wherein the pressure accumulator is connected to the at least one burner via a first fluid line, with the heating device connected therebetween. A gas turbine plant and a method for purging and/or sealing has at least one burner and a purging and/or sealing apparatus.

17 Claims, 3 Drawing Sheets

(51) Int. Cl.
*F02C 7/228* (2006.01)
*F02C 6/08* (2006.01)

(52) U.S. Cl.
CPC .... *F05D 2260/602* (2013.01); *F23D 2209/30* (2013.01); *F23K 2301/203* (2013.01)

(58) Field of Classification Search
CPC ........... F05D 2260/602; F23D 2209/30; F23R 2900/00004; F23R 2900/00012; F01D 11/04; F01D 11/10
See application file for complete search history.

(56) References Cited

U.S. PATENT DOCUMENTS

| | | | | |
|---|---|---|---|---|
| 6,216,439 B1 * | 4/2001 | Nakamoto | ............ | F01D 25/002 60/39.094 |
| 6,244,034 B1 * | 6/2001 | Taylor | ....................... | F02C 6/16 60/39.094 |
| 6,253,554 B1 * | 7/2001 | Kobayashi | ................ | F02C 7/12 60/736 |
| 8,397,487 B2 * | 3/2013 | Sennoun | ................ | B64D 13/06 60/266 |
| 10,247,110 B2 * | 4/2019 | Scipio | ....................... | F02C 9/28 |
| 2009/0165435 A1 * | 7/2009 | Koranek | ............... | F23D 17/002 60/39.463 |
| 2015/0184594 A1 * | 7/2015 | Stammen | .................. | F02C 9/46 60/776 |
| 2016/0177878 A1 * | 6/2016 | Montagne | ............... | F02C 7/057 60/779 |

OTHER PUBLICATIONS

DE Search Report dated Jun. 3, 2016, for DE patent application No. 102014212824.2.

* cited by examiner

METHOD AND APPARATUS FOR PURGING AND/OR SEALING AT LEAST ONE BURNER OF A GAS TURBINE PLANT

CROSS REFERENCE TO RELATED APPLICATIONS

This application is the US National Stage of International Application No. PCT/EP2015/063964 filed Jun. 22, 2015, and claims the benefit thereof. The International Application claims the benefit of German Application No. DE 102014212824.2 filed Jul. 2, 2014. All of the applications are incorporated by reference herein in their entirety.

FIELD OF INVENTION

The present invention relates to a purging and/or sealing apparatus for conveying a purging and/or sealing fluid to at least one burner of a gas turbine plant. The invention also relates to a gas turbine plant and to a method for purging and/or sealing at least one burner of a gas turbine plant.

BACKGROUND OF INVENTION

Gas turbine plants frequently have multiple burner stages, wherein each burner stage can be supplied individually with fuel. In that context, different burner stages can be realized by different fuel nozzles in one burner, or by each burner stage being assigned at least one burner of its own. Different burner stages will be in operation depending on the load on the turbine plant. For example, at part load or during startup or shutdown of a gas turbine plant, typically not all of the burner stages are in operation. Burner stages which are not in operation are generally sealed in order to prevent ingress of hot combustion gases from the combustion chamber into the burner stage. If the burner stages were previously in operation, they are additionally purged in order to remove, from the fuel supply system and the burners, fuel residue remaining from the previous operation.

SUMMARY OF INVENTION

The present invention has the object of providing an advantageous purging and/or sealing apparatus for conveying a purging and/or sealing fluid to at least one burner of a gas turbine plant.

The present invention has the further object of providing an advantageous gas turbine plant.

The present invention also has the further object of providing an advantageous method for purging and/or sealing at least one burner of a gas turbine plant.

The first object is achieved with a purging and/or sealing apparatus as claimed, the second object with a gas turbine plant as claimed and the third object with a method for purging and/or sealing at least one burner of a gas turbine plant, as claimed. The dependent claims contain advantageous configurations of the invention.

A purging and/or sealing apparatus, according to the invention, for conveying a purging and/or sealing fluid to at least one burner of a gas turbine plant comprises a pressure accumulator and a heating device, wherein the pressure accumulator is connected to the at least one burner via a first fluid line, with the heating device connected therebetween.

In previous purging and/or sealing apparatus for conveying a purging and/or sealing fluid to at least one burner of a gas turbine plant, it has been impossible to adapt the purging and/or sealing fluid, in terms of its pressure gradient and/or its temperature, to the pressure and temperature range that is optimal for purging and/or sealing a burner. Now, the purging and/or sealing apparatus according to the invention makes this possible. Here, the pressure vessel makes it possible to generate the desired pressure gradient at the burner outlet during purging or sealing of the burner since the pressure in the pressure vessel can be set to an appropriate pressure and/or the fluid drawn from the vessel can be appropriately throttled. In addition, the heating device allows the purging and/or sealing fluid conveyed to the burner to be preheated to the temperature of the burner, such that it is possible to avoid thermal shock. Overall, the purging and/or sealing apparatus according to the invention therefore reduces the load on the burner during purging and/or sealing, making it possible to extend the service life of the burner.

In order to be able to set a defined pressure in the pressure accumulator, it is advantageous if the pressure accumulator is assigned a compressor which keeps a fluid in the pressure accumulator at a defined pressure. The defined pressure in the pressure accumulator can thus be kept at a defined level even in the event of fluid being withdrawn for purging and/or sealing.

According to another advantageous embodiment of the invention, an adjustable throttle device can be present in the first fluid line, between the pressure accumulator and the heating device. The throttle device makes it possible to set the quantity of purging and/or sealing fluid conveyed from the pressure vessel to the at least one burner.

In one particularly advantageous embodiment of the purging and/or sealing apparatus according to the invention, the heating device comprises a heat exchanger arranged in the first fluid line and a compressor of the gas turbine plant, wherein the compressor has a compressor outlet which is connected to the heat exchanger via a second fluid line. This makes it possible for compressed—and therefore heated—compressor air, taken from the compressor during operation, to be used to bring the purging fluid essentially to the temperature of the compressor air, such that there is no temperature shock upon transition from operation of the burner to purging and/or sealing of the burner, that is to say upon switchover from compressor air flowing through the burner to purging and/or sealing fluid flowing through the burner.

Advantageously, the purging and/or sealing apparatus has, in the second fluid line, a device for setting the volumetric flow through the second fluid line. This device can for example be realized by an orifice plate, in particular by an orifice plate having an adjustable orifice diameter or an interchangeable orifice plate. By setting the volumetric flow from the compressor and through the heat exchanger, it is possible to suitably set the heating power of the heat exchanger for heating the purging and/or sealing fluid. The orifice plate is advantageously connected downstream of the heat exchanger, as seen in the flow direction of the compressor air coming from the compressor, in order to avoid, before passage through the heat exchanger, cooling of the compressor air due to expansion on passage through the orifice plate.

In the context of the purging and/or sealing apparatus according to the invention, in which the heating device comprises a compressor of the gas turbine plant and a heat exchanger arranged in the first fluid line, the second fluid line can have a fluid line section which extends from the heat exchanger to the first fluid line and opens into the first fluid line at a mouth. In that context, the mouth is located in the first fluid line, between the heat exchanger and the at least one burner. This raises the possibility of using, as purging and/or sealing fluid, compressor air as an alternative to the fluid in the pressure accumulator, the first fluid line then being advantageously shut off in order to avoid a loss of heat, when the compressor air flows through the heat exchanger, due to transfer of heat to the fluid flowing in the first fluid line. In this embodiment of the purging and/or sealing apparatus, it is advantageous if any device for setting the volumetric flow through the second fluid line, such as the above-described orifice plate, is connected downstream of the mouth, as seen in the flow direction of the compressor air coming from the compressor. This makes it possible to avoid compressor air, which is conveyed to the at least one burner as purging and/or sealing air, cooling before it is conveyed to the burner, due to expansion as it passes through the orifice. It is thus possible to largely ensure that the compressor air, during purging and/or sealing of the burner, is at essentially the same temperature as during the preceding operation of the burner.

A gas turbine plant according to the invention comprises at least one burner and a purging and/or sealing apparatus according to the invention. The properties and advantages described in relation to the purging and/or sealing apparatus according to the invention can therefore be realized in the gas turbine plant according to the invention.

The invention also provides a method for purging and/or sealing at least one burner of a gas turbine plant according to the invention. In the method, fluid in the pressure accumulator is used for purging and/or sealing the at least one burner, wherein the fluid can in particular be compressed air. The fluid is preheated, in the heating device of the gas turbine plant according to the invention, before it is conveyed to the at least one burner. As already explained above in relation to the purging and/or sealing apparatus according to the invention, preheating the purging and/or sealing fluid makes it possible to avoid thermal shock when switching from regular operation of a burner to purging operation of the burner. In addition, the pressure accumulator makes it possible to provide a defined pressure drop across the burner during the purging and/or sealing procedure. If the pressure accumulator is always kept at a defined pressure, the defined pressure drop can also be maintained during the entire purging and/or sealing procedure.

In one refinement of the method according to the invention, in which the gas turbine plant comprises a compressor, compressor air is used for purging and/or sealing the at least one burner if the pressure provided by the compressor is sufficient for purging and/or sealing the at least one burner. Otherwise, that is to say if the pressure provided by the compressor is insufficient for purging and/or sealing the at least one burner, fluid taken from the pressure accumulator and preheated by means of the heating device before it is conveyed to the at least one burner is used for purging and/or sealing the at least one burner. In this embodiment of the method, compressor air can be used as purging and/or sealing fluid in a number of operating states of the gas turbine plant. Only in operating states in which the compressor pressure is not sufficient to generate the desired pressure gradient across the burner is the purging and/or sealing fluid stored in the pressure accumulator used. This makes it possible to work with a relatively small store of purging and/or sealing fluid in the pressure accumulator.

Further features, properties and advantages of the present invention are provided by the below description of exemplary embodiments, with reference to the accompanying figures.

DETAILED DESCRIPTION OF INVENTION

Figure 1:
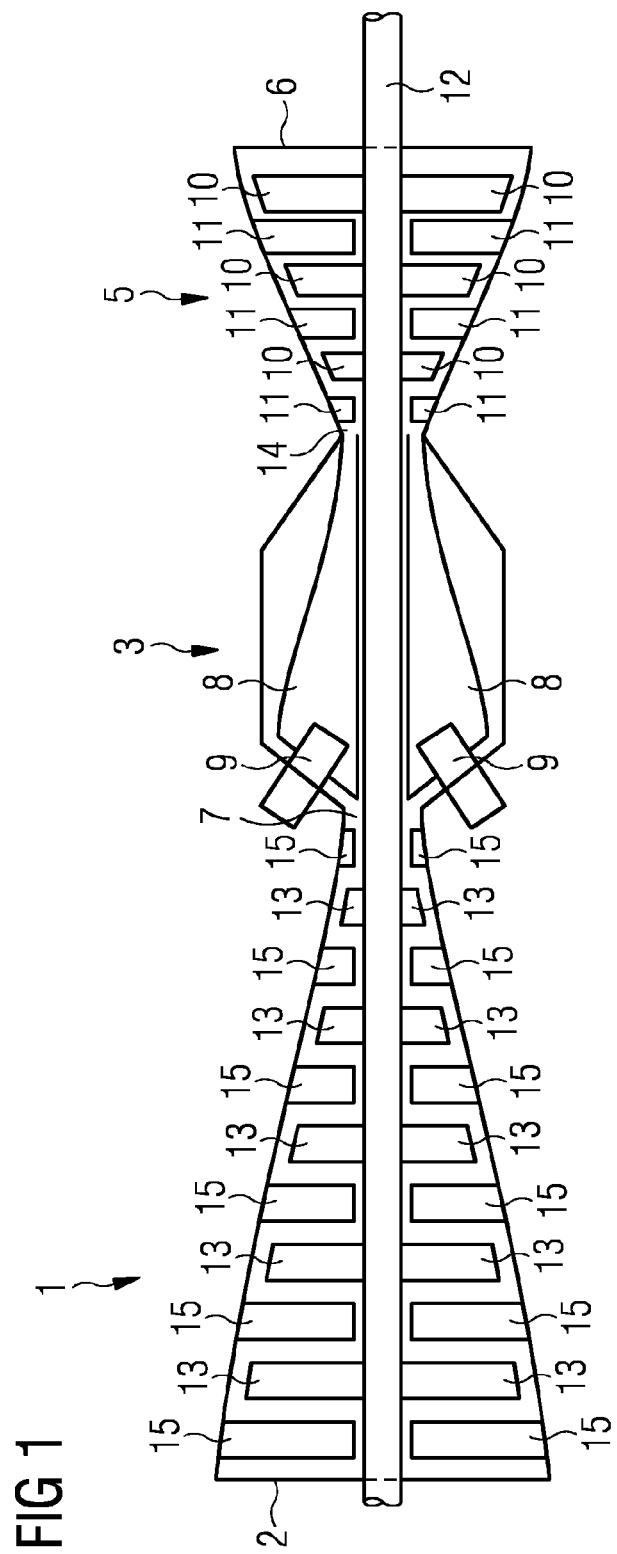
FIG. 1 shows a gas turbine plant in a highly diagrammatic representation.

There follows a description, with reference to FIG. 1, of the basic construction of a gas turbine plant. The figure shows the gas turbine plant in a highly diagrammatic manner and, for the sake of clarity, omits a number of details that are irrelevant for understanding the present invention. The gas turbine plant shown in FIG. 1 comprises a compressor 1 with a compressor inlet 2 via which ambient air can enter the compressor, a combustion chamber section 3 and a turbine 5 with a turbine outlet 6. The plant forms a flow path from the compressor inlet 2 to the turbine outlet 6, wherein a burner plenum 4 is fluidically connected to a compressor outlet 7 and, via burners 9 and combustion chambers 8, to a turbine inlet.

During operation of the gas turbine plant, air compressed by the compressor 1 is fed via the burner plenum 4 to the burners 9. In the burners 9, the supplied air is mixed with an also supplied fuel—which can be a liquid or a gaseous fuel—and the mixture is ignited and burnt, producing exhaust gases at high temperature and pressure which then serve as the working medium for the downstream turbine 5. The working medium expands and cools as it flows through the turbine 5 to the turbine outlet 6, transferring impulse to turbine blades 10 that are arranged on a shaft 12. This impulse sets the shaft in rotation such that the rotating shaft 12 can be used for example to drive a generator or a work machine (not shown). In order to optimize the flow in the turbine 5, and thus the transfer of impulse to the turbine blades 10, stationary guide vanes 11 are arranged in the turbine 5 and serve to orient the mass flow of working medium.

In the present exemplary embodiment, the rotating shaft 12 is also used to drive the compressor 1. This comprises rotating compressor blades 13 which serve to force intake air from the compressor inlet 2 through a narrowing flow path, thus compressing it. The compressor 1 also comprises stator vanes 15, which also serve to orient the flow of the air that has entered the compressor, in order to optimize the compressor process.

Thus, during operation of a gas turbine, air compressed by the compressor 1 is supplied to the burners 9 in order to serve there as oxidant for the combustion of the fuel and, together with the fuel in the form of combustion exhaust gases, form the working medium for the turbine 5. In order to be able to operate gas turbine plants at different loads use is often made of a design having multiple burner stages, wherein the individual burner stages can be supplied individually with fuel. In this context, the burner stages can be realized by fuel nozzles, within a burner, which are to be supplied individually with fuel, or by a number of burners which are to be supplied individually with fuel. In the present exemplary embodiment, they are realized by burners which are to be supplied individually with fuel.

When the gas turbine plant is operated with different loads, some burner stages can be switched off, in particular if the gas turbine is operated at part load or the gas turbine is being started up or shut down. Those burners which, in such load circumstances, are not supplied with fuel are then purged in order to flush out, of the corresponding burners and the associated fuel lines, any fuel remaining in the burners and the lines. In addition, the burners and/or lines are sealed, using a sealing fluid issuing from the burner stages, against ingress of hot combustion gases from the combustion chambers into the burners. A first exemplary embodiment for a corresponding purging and/or sealing apparatus is described below with reference to FIG. 2.

Figure 2:
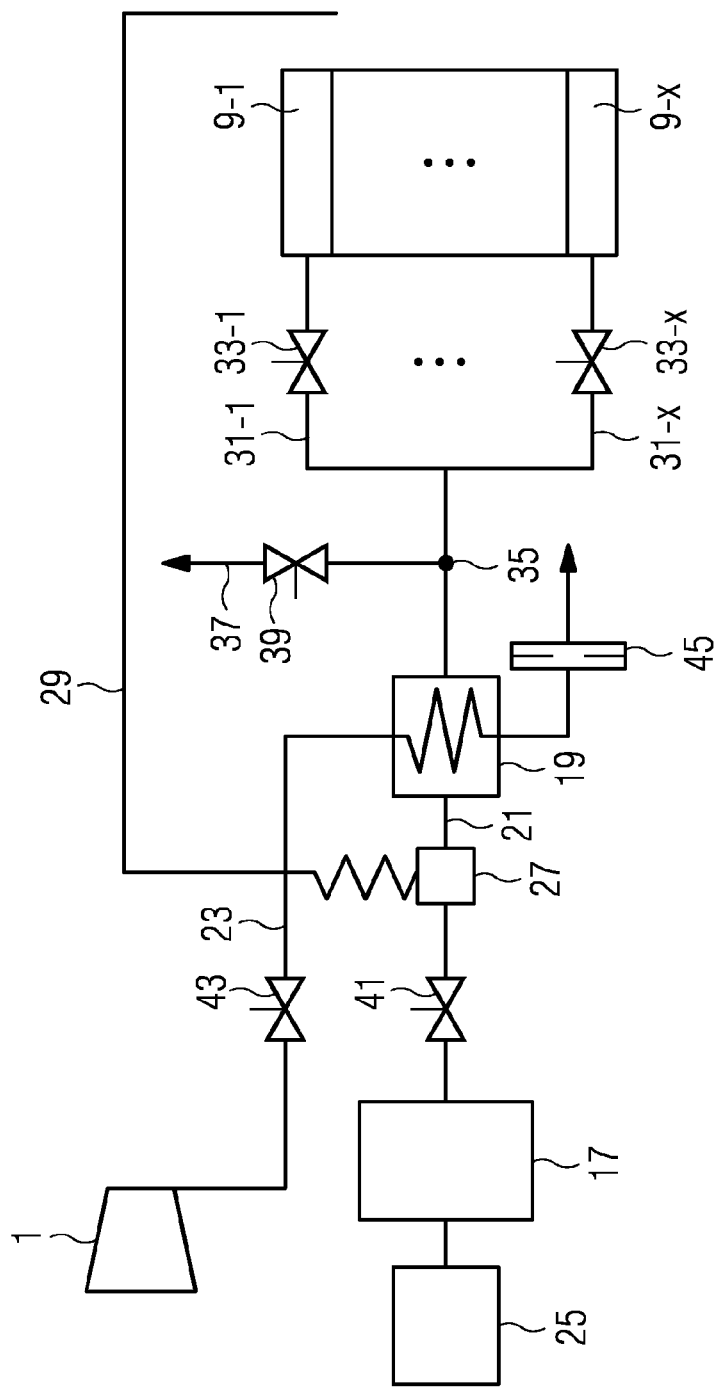
FIG. 2 shows a gas turbine plant with a first exemplary embodiment for the purging and/or sealing apparatus according to the invention.

The purging and/or sealing apparatus shown in FIG. 2 comprises a pressure accumulator 17, a heat exchanger 19, a first fluid line 21 that extends from the pressure accumulator 17 to the burners 9-1 to 9-x, and a second fluid line 23 that extends from the compressor 1 to the heat exchanger 19 and beyond. The first fluid line 21 serves for supplying a pressurized fluid, in the present exemplary embodiment compressed air, from the pressure accumulator 17 to the burners 9-1 to 9-x, in order to purge and/or seal the latter using the supplied compressed air. In order to be able to supply purging and/or sealing fluid individually to the individual burners 9-1 to 9-x, which in the embodiment variant shown in FIG. 2 represent individual burners, the first fluid line 21 splits, downstream of the heat exchanger 19, into branch lines 31-1 to 31-x in which there are individually actuable shutoff valves 33-1 to 33-x.

In the present exemplary embodiment, the pressure vessel 17 is connected to an external compressor 25 in order to be able to keep the compressed air in the pressure vessel 17 at a defined pressure. Furthermore, the fluid line 21 contains a throttle 27 which can be used to set the pressure in the fluid line 21. Throttling can be effected either mechanically or electronically on the basis of the gas turbine power. To that end, the throttle 27 is connected, via a suitable signal line, to a device that outputs the gas turbine power as output signal. When the burners 9-1 to 9-x are supplied with compressed air from the pressure vessel 17 as purging and/or sealing fluid, the throttle 27 is used to set a suitable pressure with regard to the combustion chamber pressure prevailing in the combustion chamber or chambers, and the heat exchanger 19 is used to preheat to essentially the same pressure as the compressor air, in order to keep the burner through which the purging and/or sealing fluid flows at essentially the same temperature as the burners through which compressor air flows, and thus avoid excessive temperature gradients when switching from regular operation to purging and/or sealing operation.

When one or more burner stages 9-1 to 9-x are supplied with compressed air from the pressure vessel 17 for purging and/or sealing, the suitable pressure in the fluid line leading to the corresponding burners is set with the aid of the throttle 27, and the heat exchanger 19 is used to heat the compressed air to a temperature that essentially corresponds to the temperature of the compressor air. The heat exchanger thus forms, together with the compressor 1 of the gas turbine plant, a heating device for heating the purging and/or sealing fluid. At this point, it is noted that the heat for heating the purging and/or sealing fluid need not necessarily come from compressor air. Other heating devices, for example heating devices powered by electricity or by combustion, may also be used.

In order to be able to release pressurized purging and/or sealing fluid in the fluid line, there is, between the heat exchanger 19 and the branch lines 31-1 to 31-x leading to the burners 9-1 to 9-x, a branching point 35 from which a further branch line 37, with a shutoff valve 39 located therein, branches off. Shutoff valves are also located between the pressure accumulator 17 and the throttle 27 in the first fluid line 21 (shutoff valve 41), and between the compressor 1 and the heat exchanger 19 in the second fluid line 23 (shutoff valve 43).

If purging and/or sealing fluid from the pressure vessel 17 is supplied to one or more of the burners 9-1 to 9-x, the shutoff valve 41, the shutoff valve 43 and the shutoff valves 33-1 to 33-x in the branch lines 31-1 to 31-x leading to the corresponding burners 9-1 to 9-x are opened. By contrast, the shutoff valve 39 in the branch line 37 is closed. If none of the burners 9-1 to 9-x is to be supplied with purging and/or sealing fluid, the shutoff valves 31 and 43 and the shutoff valves 33-1 to 33-x are closed and the shutoff valve 39 in the branch line 37 is open in order to release the pressure from the line section of the first fluid line 21, which lies between the shutoff valve 41 and the shutoff valves 33-1 to 33-x.

If one or more of the burners 9-1 to 9-x is/are to be supplied with purging and/or sealing fluid from the pressure vessel 17, the quantity of heat required for heating the purging and/or sealing fluid is dependent on how many burners 9-1 to 9-x are to be supplied with purging and/or sealing fluid. In order to set a suitable quantity of heat transferred in the heat exchanger 19, there is in the second fluid line 23 an orifice plate 45 having an adjustable orifice. This orifice plate 45 is located in a section of the second fluid line lying downstream of the heat exchanger 19, as seen in the flow direction of the compressor air through the second fluid line 23. When the compressor air passes through the orifice plate 45, not only is the volumetric flow limited, but also the property of the orifice plate as a constriction leads to expansion and thus to cooling of the compressor air passing through. Arranging the orifice plate 45 downstream of the heat exchanger ensures that the temperature of the compressor air in the heat exchanger essentially matches the temperature of the compressor air supplied to the burner plenum 4.

With the embodiment variant, shown in FIG. 2, of the purging and/or sealing apparatus according to the invention, the compressor air is used in the purging and/or sealing apparatus only for heating the compressed air drawn from the pressure vessel 17. The supply of purging and/or sealing fluid is effected in stationary fashion from the pressure accumulator 17. One embodiment variant of the purging and/or sealing apparatus according to the invention, in which the burners 9-1 to 9-x are also supplied with compressor air as purging and/or sealing fluid, is described below with reference to FIG. 3. Elements of the second exemplary embodiment which correspond to elements of the first exemplary embodiment are denoted in FIG. 3 using the same reference numbers as in FIG. 2, and are not described again in order to avoid repetition.

The second embodiment variant of the purging and/or sealing apparatus according to the invention differs from the first embodiment variant only in that the second fluid line 23 has a fluid line section 47 via which it opens into the first fluid line 21 downstream of the heat exchanger 19. In the present exemplary embodiment, the second fluid line 23 opens, via the fluid line section 47, into the branching point 35. The fluid line section 27 opening into the first fluid line 21 makes it possible to supply, to the first fluid line 21, compressor air which can then be supplied, as purging and/or sealing fluid and instead of the compressed air originating in the pressure accumulator 17, to at least one of the burners 9-1 to 9-x via the two branch lines 31-1 to 31-x.

Figure 3:
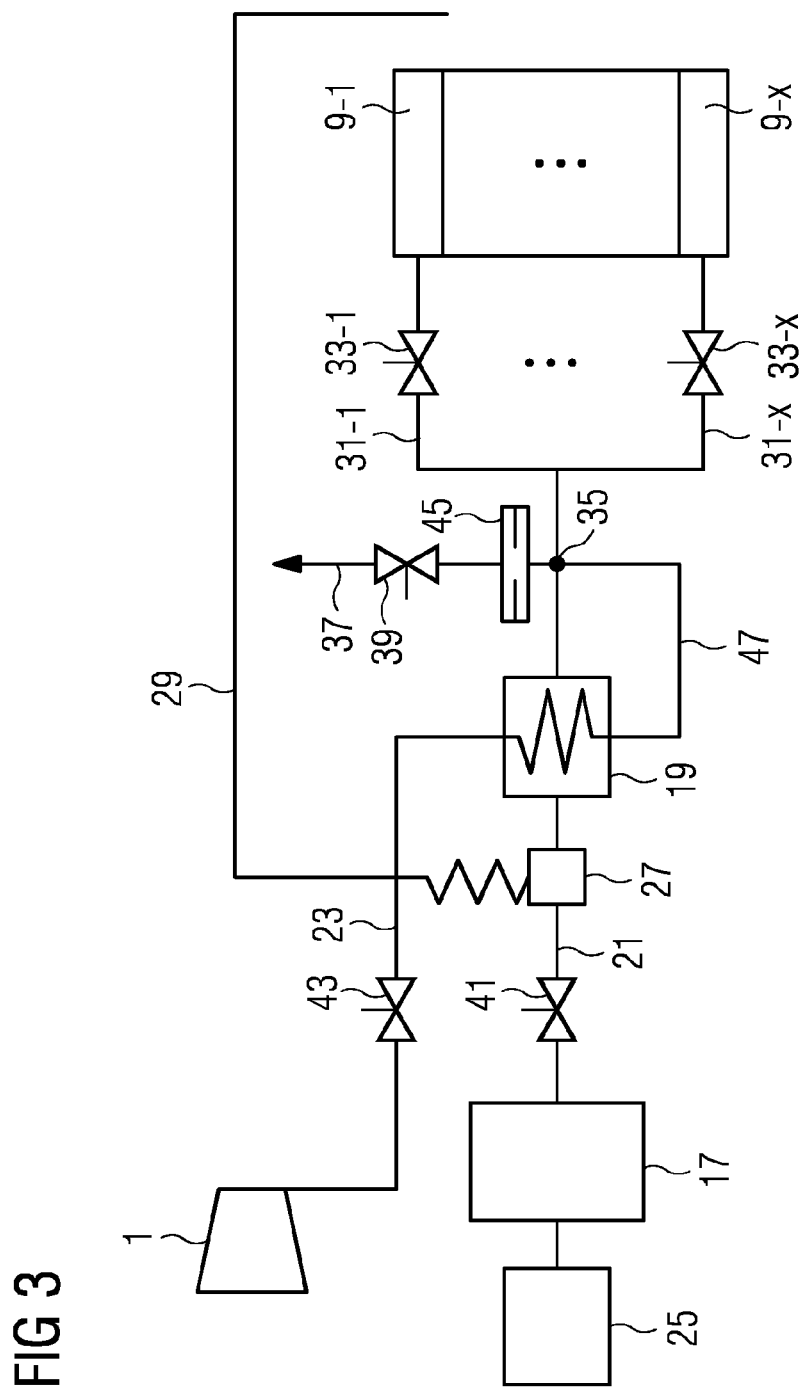
FIG. 3 shows a gas turbine plant with a second exemplary embodiment for the purging and/or sealing apparatus according to the invention.

The embodiment variant, shown in FIG. 3, of the purging and/or sealing apparatus according to the invention makes it possible to selectively use compressor air or compressed air stored in the pressure accumulator 17 as purging and/or sealing fluid. It is then possible to establish a method for purging and/or sealing at least one burner, in which compressor air bled from the compressor 1 is supplied, via the second branch line 23, to the burners which are to be purged and/or sealed if the pressure in the bleed line of the compressor 1, forming the second branch line 23, is sufficient for the purging and/or sealing device, that is to say is higher than in the combustion chamber into which the burner that is to be purged and/or sealed opens. If the pressure in the second fluid line 23 for purging and/or sealing the burner or burners is not sufficient, purging and/or sealing is instead carried out using bled compressor air with the aid of compressed air drawn from the pressure accumulator 17.

The present invention has been described on the basis of exemplary embodiments for explanatory purposes. However, deviations from the exemplary embodiments are possible within the scope of the invention. For example, instead of an orifice plate having an adjustable orifice, it is possible to use an orifice plate device having a number of different orifice plates that can be introduced into the compressor air stream, such as an orifice plate wheel. Therefore, the present invention should not be considered to be restricted to the combinations of features described in the exemplary embodiments. Rather, the invention is to be defined by the appended claims.

The invention claimed is:

1. A purging and/or sealing apparatus, comprising:
   a pressure accumulator,
   a heating device, and
   a first fluid line, wherein the pressure accumulator is connected to at least one burner of a gas turbine plant via the first fluid line, with the heating device connected therebetween,
   a purging/sealing circuit in which purging and/or sealing fluid travels from the pressure accumulator to the heating device and then to the at least one burner,
   wherein when the gas turbine plant is in operation but the at least one burner is not being supplied with fuel the purging and/or sealing fluid in the purging/sealing circuit is effective to purge any fuel from the at least one burner and seal the at least one burner,
   wherein the purging and/or sealing fluid is heated by the heating device, and
   wherein the heating device comprises a heat exchanger arranged in the first fluid line and a compressor of the gas turbine plant, wherein the compressor is connected to the heat exchanger via a second fluid line such that compressed air from the compressor passes through the heat exchanger to heat the purging and/or sealing fluid.

2. The purging and/or sealing apparatus as claimed in claim 1, further comprising:
   a device in the second fluid line adapted for setting a volumetric flow through the second fluid line.

3. The purging and/or sealing apparatus as claimed in claim 2,
   wherein the device adapted for setting the volumetric flow through the second fluid line is connected downstream of the heat exchanger.

4. The purging and/or sealing apparatus as claimed in claim 1,
   wherein the second fluid line comprises a fluid line section which extends from the heat exchanger to the first fluid line and opens into the first fluid line at a mouth, wherein the mouth is located in the first fluid line, between the heat exchanger and the at least one burner.

5. The purging and/or sealing apparatus as claimed in claim 1, further comprising:
   a first shutoff valve and a second shutoff valve,
   wherein the first shutoff valve is arranged in the first fluid line between the pressure accumulator and the heat exchanger, and the second shutoff valve is arranged in the second fluid line between the compressor and the heat exchanger.

6. The purging and/or sealing apparatus as claimed in claim 1,
   wherein the pressure accumulator is fluidically connected to an external compressor which keeps a fluid in the pressure accumulator at a defined pressure.

7. The purging and/or sealing apparatus as claimed in claim 1, further comprising:
   an adjustable throttle device in the first fluid line, between the pressure accumulator and the heating device.

8. The gas turbine plant, comprising:
   the at least one burner, and
   the purging and/or sealing apparatus as claimed in claim 1.

9. A method for purging and/or sealing the at least one burner of the gas turbine plant as claimed in claim 8, the method comprising:
   using fluid in the pressure accumulator for purging and/or sealing the at least one burner,
   wherein the fluid is preheated, in the heating device, before it is conveyed to the at least one burner.

10. The method as claimed in claim 9,
    wherein the fluid in the pressure accumulator is always kept at a defined pressure.

11. The method as claimed in claim 9,
    wherein the fluid is throttled before it is conveyed to the at least one burner.

12. The method as claimed in claim 9, the method further comprising:
    using compressor air for purging and/or sealing the at least one burner if a pressure provided by the compressor is sufficient for purging and/or sealing the at least one burner, and
    using fluid taken from the pressure accumulator and preheated by means of the heating device before it is conveyed to the at least one burner for purging and/or sealing the at least one burner if the pressure provided by the compressor is insufficient for purging and/or sealing the at least one burner.

13. The purging and/or sealing apparatus as claimed in claim 1, further comprising an external compressor configured to provide the purging and/or sealing fluid to the pressure accumulator, wherein the external compressor is discrete from the compressor of the gas turbine plant configured to deliver compressed air to a combustor of the gas turbine plant for combustion.

14. The purging and/or sealing apparatus as claimed in claim 4, further comprising a device in the second fluid line adapted for setting a volumetric flow through the second fluid line.

15. The purging and/or sealing apparatus as claimed in claim 1, further comprising an air compressor connected to the pressure accumulator and configured to compress and deliver the purging and/or sealing fluid to the pressure accumulator, wherein the purging and/or sealing fluid comprises air.

16. The purging and/or sealing apparatus as claimed in claim 1, wherein the operation of the gas turbine plant comprises part load, startup, or shutdown.

17. A purging and/or sealing apparatus, comprising:
- a pressure accumulator,
- a heating device,
- a first fluid line, wherein the pressure accumulator is connected to at least one burner via the first fluid line, with the heating device connected therebetween, and
- a purging/sealing circuit in which purging and/or sealing fluid travels from the pressure accumulator to the heating device and then to the at least one burner,
- wherein the purging and/or sealing fluid is heated by the heating device,
- wherein the heating device comprises a heat exchanger arranged in the first fluid line and a compressor of a gas turbine plant, wherein the compressor is connected to the heat exchanger via a second fluid line such that compressed air from the compressor passes through the heat exchanger to heat the purging and/or sealing fluid, and
- wherein the second fluid line comprises a fluid line section which extends from the heat exchanger to the first fluid line and opens into the first fluid line at a mouth, wherein the mouth is located in the first fluid line, between the heat exchanger and the at least one burner.

\* \* \* \* \*